United States Patent
Malloy et al.

[15] 3,637,359
[45] Jan. 25, 1972

[54] COATED ABRASIVE BELT OVERLAP JOINT

[72] Inventors: John F. Malloy, Waterford; Charles J. Seiler, Elnora, both of N.Y.

[73] Assignee: Norton Company, Troy, N.Y.

[22] Filed: Jan. 6, 1970

[21] Appl. No.: 916

Related U.S. Application Data

[63] Continuation-in-part of Ser. No. 514,360, Dec. 16, 1965, abandoned.

[52] U.S. Cl. ........................51/298, 51/297, 51/399, 156/137, 156/153, 156/258, 161/36, 161/190, 260/75 NC, 260/75 NK, 260/858
[51] Int. Cl. ........................................................B24d 11/00
[58] Field of Search ...................156/258, 304, 153, 137; 161/36, 38, 39, 190, 162; 260/31.2, 835, 858, 75 NK, 75 NA; 51/297, 298, 399, 357, 401, 402, 405, 407

[56] References Cited

UNITED STATES PATENTS

| | | | |
|---|---|---|---|
| 2,350,861 | 6/1944 | Argy et al. | 51/298 X |
| 2,794,726 | 6/1957 | Riedesel et al. | 51/298 X |
| 2,912,408 | 11/1959 | Nischk et al. | 260/858 |
| 3,063,958 | 11/1962 | Perkins et al. | 260/38 |
| 3,156,659 | 11/1964 | Robitschek | 260/2.5 |
| 3,202,728 | 8/1965 | Kohn | 260/858 |
| 3,437,622 | 4/1969 | Dahl | 161/190 X |
| 3,490,987 | 1/1970 | Bauriedel | 161/190 |

Primary Examiner—John T. Goolkasian
Assistant Examiner—Joseph C. Gil
Attorney—Hugh E. Smith and Herbert L. Gatewood

[57] ABSTRACT

An adhesive composition is provided for the manufacture of coated abrasive belts which has the advantageous characteristics of a relatively long permissible dwell time, shelf and/or pot life, and which provides on curing, after application as a coating, good adhesion. The cured product of the adhesive composition comprises in admixture the reaction product of a hydroxyl terminated polyurethane-polyester and a component having available free isocyanate groups, and a suitable tackifying agent.

5 Claims, 2 Drawing Figures

PATENTED JAN 25 1972  3,637,359

INVENTORS
JOHN F. MALLOY
CHARLES J. SEILER
BY
Herbert L. Gatewood
ATTORNEY

COATED ABRASIVE BELT OVERLAP JOINT

CROSS-REFERENCE TO RELATED APPLICATIONS

This application is a continuation-in-part of our application, Ser. No. 514,360 filed Dec. 16, 1965, for Coated Abrasive Belt Joining, now abandoned.

DEFINITIONS

The term "pot life" used herein is the time which expires after the addition of catalyst to the adhesive composition before it reaches an "unusable state." This "unusable state" is that at which the adhesive composition can no longer be spread. Pot life is different from "shelf life." Shelf life corresponds to the time which expires before the adhesive composition without catalyst reaches an "unusable state." The shelf life of an adhesive composition always exceeds the pot life thereof.

By the term "dwell time" is meant the time which expires after application of the adhesive composition to a surface before such coated surface is assembled together with another for joining. It is the "open time" during which the faying surfaces can be assembled and a satisfactory adhesive bond achieved.

Usually, the pot and/or shelf life of an adhesive composition is less than the dwell time. In any event, so long as an adhesive composition is applied to a substrate within its pot or shelf life and such coated substrate is assembled with another within the dwell time satisfactory adhesion will result.

BACKGROUND OF THE INVENTION

1. Field of the Invention

The present invention relates in general to endless coated abrasive belts and to their method of manufacture using an adhesive composition having extended permissible shelf and pot life and dwell time.

2. Description of the Prior Art

Over the years a variety of adhesive compositions have been used for the bonding together of various materials. For the most part, adhesive compositions are classified broadly as to their chemical compositions and because of such are termed proteinaceous, starchlike, thermoplastic synthetic resin, thermosetting synthetic resin, rubberbase, and the like. The specific adhesive composition used at any particular time depends to a very great extent on the particular application for which the adhesive is intended and upon the ultimate use of the thing to which the adhesive composition is applied.

The demands of an adhesive in bonding together the free ends of coated abrasive material, particularly in the formation of an endless belt, are rather severe. A coated abrasive belt during use is subjected to relatively high tensile and flexural forces. Thus, any adhesive composition used in the formation of belt joints must be strong and flexible as well as provide good adhesion (high peel strength) to prevent delamination of the belt joint upon being subjected to severe flexing operation, especially when running over a small diameter contact roll. Moreover, the adhesive must be resistance to heat, water, lubricants and cutting fluids encountered in abrading operations.

In some instances adhesive compositions, which might otherwise provide desirable belt joints, are unsuitable because they do not have a desirable shelf or pot life or allow sufficient dwell time. An adhesive composition for coated abrasive belt manufacture should have the longest shelf or pot life possible. The longer the shelf or pot life, the larger the batch of adhesive composition that can be prepared at any one time. Such makes for a more efficient and less costly manufacturing operation than where small quantities of adhesive composition must be made up repeatedly for relatively immediate use. When dwell time, because of the particular adhesive composition, by necessity, is relatively short, a smooth abrasive belt manufacturing operation is difficult, if not impossible, to achieve. This is because such adhesive composition can be applied only to a few belt ends at any one time before it becomes essential to stop the adhesive application and assemble together the first coated ends. Moreover, observance of permissible shelf or pot life and dwell time is, of course, absolutely necessary. The alternative is a batch of unusable adhesive composition which, in many instances, is difficult to remove from the vessel containing such, and defective belt joints. Where the pot life or shelf life and dwell time is relatively short, the potential for such problems to occur is enhanced.

A further disadvantage with the use of some adhesive compositions is that they require an inordinate amount of time in curing before sufficient cohesive and adhesive strength is attained to permit handling of the bonded material. Although reasonable shelf and pot life and dwell time are desirable in an adhesive composition used in the manufacture of abrasive belts, it is also desirable that the adhesive composition set up and cure sufficiently within a reasonable period of time so that the adhesive composition will have adequate strength to permit further handling and processing of the belts manufactured therewith. It is further desirable that the adhesive composition attain maximum strength as soon as possible.

Heretofore others have suggested the use of various polyurethane adhesive compositions for the bonding of all sorts of lamina. However, to our knowledge, the use of such adhesive compositions has been met with only limited acceptance in the coated abrasive industry. This may be because of their relatively high costs in comparison to adhesives conventionally used; however, in all probability such adhesive compositions have not been used to any great extent in the coated abrasive industry because the maximum strength and toughness of such adhesives is believed generally to develop only after an extended period of cure and because of their relatively short shelf and pot life and permissible dwell time.

SUMMARY OF THE INVENTION

In accordance with the general aspects of our invention, an adhesive composition is provided for the manufacture of coated abrasive belts having extended permissible shelf and pot life and dwell time. Thus, a more economical, efficient, and smoother abrasive belt manufacturing operation is made possible as larger batches of adhesive composition can be prepared at any one time thereby eliminating the need for repeatedly preparing smaller batches. Moreover, the longer permissible dwell time makes it possible to prepare abrasive strip material and coat the ends thereof with adhesive composition and to stockpile such adhesive coated strip material for subsequent manufacture into endless belts. With the adhesive composition used in the practice of our invention sufficient dwell time can be provided to eliminate any "down time" in manufacture of belts on starting up a shift after a holiday or after the weekend.

The adhesive composition used in our invention, in general, has as its essential components a so-called "two component" polyurethane adhesive composition and a tackifying agent. Quite advantageously, it has been discovered, inclusion of a suitable tackifying agent in the polyurethane adhesive composition not only makes for an adhesive bond of greater initial strength with less holding time in the press, and of sufficient strength to handle the joint shortly after removal therefrom, but such also has been discovered to slow down the rate of cure of the polyurethane adhesive composition. This discovery, which we believe is totally unexpected, makes it possible to provide a polyurethane adhesive composition for manufacture of coated abrasive belts having longer permissible shelf and/or pot life and dwell time. Moreover, such desirable features are attained without detrimentally affecting the properties of the unmodified polyurethane adhesive composition.

Coated abrasive belts manufactured utilizing the adhesive composition herein disclosed have been found in use to have a joint possessing excellent resistance to forces tending to "peel" or delaminate one joined surface from the other. Such coated abrasive belt joints, as manufactured in accordance with our invention, make for overall good performance in usage resulting from less downtime, and hence for a more economical abrading operation.

BRIEF DESCRIPTION OF THE DRAWING

The invention will be better understood by referring to the drawing in which like numerals refer to like parts in the various views and in which.

DETAILED DESCRIPTION OF THE INVENTION

Figure 1:
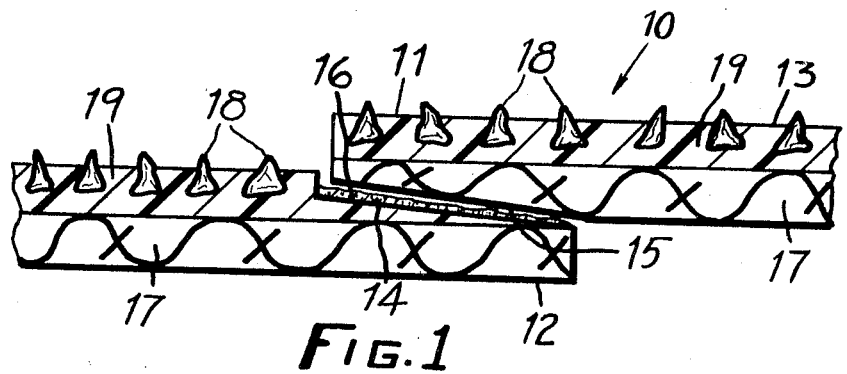
FIG. 1 is a partial cross-sectional view of an endless coated abrasive belt showing, in particular, the joint in the belt.

Referring to the drawing, there is disclosed in FIG. 1 thereof, in part, an endless coated abrasive belt 10 formed, as hereinafter more fully described, by joining together ends 11, 12 of abrasive strip material 13 by means of an adhesive 14. End 11, for sake of clarity, is not shown in contact with adhesive 14 which also, for sake of clarity, is shown in exaggerated thickness; however, it will be readily understood that in a completed belt surfaces 15, 16 of belt ends 11, 12 will be closely adjacent one another and secured together by means of adhesive 14.

Figure 2:
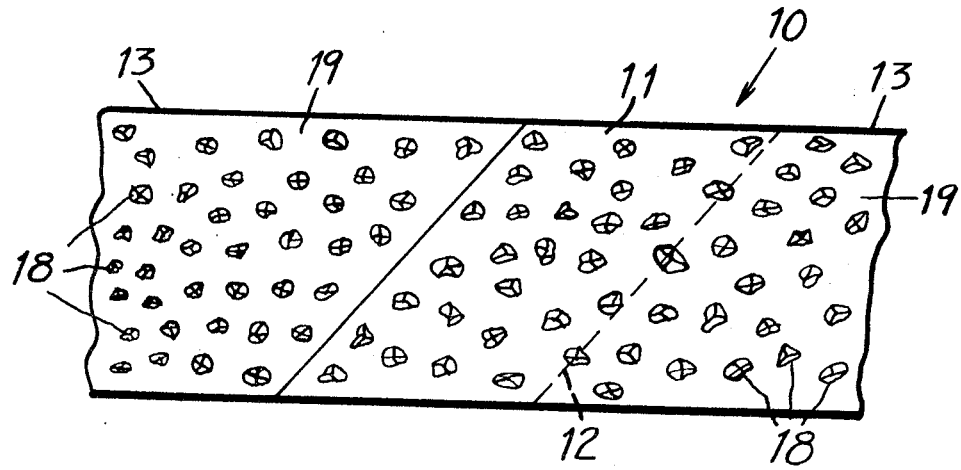
FIG. 2 is a plan view of the abrasive belt shown in FIG. 1 indicating the manner in which an end cut may be made preparatory to forming the belt.

Abrasive strip material 13, as is usual, preparatory to formation of an abrasive belt is cut to the desired width and length from coated abrasive sheet material. The ends 11, 12 of the coated abrasive strip are preferably cut at an angle to the lengthwise direction, as more clearly shown in FIG. 2 of the drawing. However, if desired, the cut can be made normal to the lengthwise direction. In the practice of our invention it is preferred, as shown, that surfaces 15, 16, in accordance with usual techniques, be beveled by abrading and skiving, respectively. Such provides a narrow area delimited adjacent the free ends of the abrasive strip for application of the adhesive composition, makes for better adhesion, and lesser joint thickness.

Coated abrasive sheet material used in the practice of our invention is of conventional manufacture and forms no part of the invention per se. In general, the abrasive material comprises a backing member 17, and abrasive grain 18 secured to the backing member by means of an adhesive bond 19.

Adhesive 14 is the cured product of an adhesive composition having as its essential components in admixture a two-component polyurethane adhesive composition, and a suitable tackifying agent. Two-component polyurethane adhesive compositions, as is deemed well known, have as the essential components thereof an isocyanate and a polyfunctional active hydrogen-containing component. We have discovered in the practice of our invention that a particularly suitable active hydrogen-containing component is a hydroxyl terminated polyurethane-polyester having a hydroxyl number of from two to 15. Hydroxyl terminated polyurethane-polyesters having a hydroxyl number above about 15 are to be avoided, as hereinafter further explained, as they, among other things, result in an adhesive composition having a lower shelf and/or pot life and less permissible dwell time than is desired. Such a polyurethane-polyester as is desired in the practice of the invention is commercially available in solvent solution from United Shoe Machinery and is identified as "Bostik 7070" in their bulletin BA20, page 4. "Bostik 7076" is comparable except that a mixture of acetone-toluene is used as the solvent rather than ethyl acetate. The solvent used is of no consequence and other solvents or diluents suitable as a vehicle for polyurethane can be used. Merely by way of example, methyl ethyl ketone may be used, if desired. The polyurethane-polyester in "Bostik 7076" is believed to be the reaction product of toluene diisocyanate with a hydroxyl terminated polyester of adipic acid and butylene glycol. The manner of manufacture of such polyurethane-polyester is believed substantially disclosed in U.S. Pat. No. 2,912,408.

The particular isocyanate component utilized in the practice of the invention is not critical so long as it has available sufficient free isocyanate groups to react with the reactive hydrogens and thus cure or cross-link the adhesive composition. Any organic diisocyanate or polyisocyanate such as triisocyanates and tetraisocyanates, or mixture of diisocyanates, polyisocyanates, or both may be used. Merely by way of example, toluene diisocyanate, polyphenyl polymethylene polyisocyanate, triphenyl methane triisocyanate, and the like may be used. However the particular diisocyanate or polyisocyanate used must be either soluble in the solvent used for the polyurethane-polyester or dissolved in a solvent compatible therewith. An isocyanate material found particularly suitable in practice of the invention is a product commercially available under the trade designation Mondur CB-75 from Mobay Chemical Company. This product is described in *Urethane Coating*, Second Edition, published by Mobay and is the reaction product of trimethylol propane and toluene diisocyanate.

As the curing or cross-linking of the adhesive composition depends upon the number of (—NCO) groups present in the isocyanate component, the amount of isocyanate component required depends, of course, on the amount of and particular hydroxyl terminated polyurethane-polyester used in the adhesive compositions, as well as upon the particular isocyanate used. In general, however, satisfactory curing will be obtained if the isocyanate component is provided in sufficient quantity to provide from 0.075 g. (—NCO) to 0.68 g. (—NCO) per 8 g. polyurethane-polyester, as above described.

In the formulating of a so-called "two-component polyurethane adhesive composition," it has been, in general, the practice to maintain the active hydrogen-containing component and isocyanate component separate until just a relatively short time prior to use, since upon contact one with the other, especially in the presence of a catalyst, the two components react with each other and thus effect the cure. However, we have discovered, it is believed quite unexpectedly and advantageously, that the rate of curing can be slowed down and in fact, regulated, by including in certain desired proportions, in the polyurethane composition a suitable tackifying agent. Although we do not wish to be held to this theory, this effect on curing appears to result because the (—NCO) groups are consumed at a different rate of reaction when the tackifying agent is present. Control of the hydroxyl number of the polyurethane-polyester used and the presence of a suitable tackifying agent appears to aid in limiting the primary reaction in the adhesive composition to the formation of the urethane and to reduce formation of disubstituted ureas. Such is desirable not only because extended pot life and permissible dwell time in some manner result, but also because formation of disubstituted ureas in a polyurethane composition is believed to terminate polymer chain formation with a resultant adverse effect on the strength and flexibility of a belt joint formed with such adhesive. In any event, and whatever the cause, our discovery makes it possible to provide a polyurethane adhesive composition for the manufacture of coated abrasive belts with extended shelf and/or pot life and dwell times not believed used for such purposes heretofore.

Tackifying agents are deemed well known in the adhesive art and, in general, are merely natural or synthetic materials which are inherently tacky. However, not all tackifying agents, we have found, are suitable in the practice of our invention. For the most part tackifying agents which may be found suitable in the practice of the invention are those which are compatible with the polyurethane component. Moreover, such agents must produce no adverse effects on the physical properties of the unmodified polyurethane adhesive composition.

Tackifying agents meeting the above-mentioned requirements are exemplified by certain alkylated polystyrene resins commercially available under the trade designation Picolastic E-75 and E-125 and chlorinated aromatic and aliphatic hydrocarbons such as are commercially available under the trade designations Paroil 170 HV, Aroclor, and Unichlor. The chlorinated hydrocarbons are preferred and have been found to be particularly suitable for use in the practice of the invention especially those containing a minimum of 40 percent combined chlorine. In addition to Paroil 170 HV having 70 percent combined chlorine (available from Dover Chemical Company, Dover, Ohio and described in their product release of September 1958, revised March, 1959, other suitable specific chlorinated hydrocarbons, and which are available commercially, include Aroclor 5460, a chlorinated triphenyl containing 60 percent chlorine; Aroclor 1268 and 1254, chlorinated biphenyls containing 68 percent chlorine and 54 percent chlorine, respectively (available from Monsanto Chemical Company and described in their Technical Bulletin No. PL-306 of Dec. 1960); and Unichlor-40 and 50, chlorinated aliphatic hydrocarbons containing 41.5 percent and 51 percent chlorine, respectively (available from Neville Chemical Company and described in their bulletin "U-nichlor" NCL-5-10M-63).

In general, the greater the amount of tackifying agent used in the adhesive composition, the longer is the permissible shelf and/or pot life thereof and the greater is the permissible dwell time. For all practical purposes, however, we have found that the tackifying agent should be present in the adhesive composition in an amount of from about 1 to about 32 percent, preferably from about 6 to about 19 percent by weight, based on the total adhesive solids.

Where prolonged shelf life and dwell time are of primary consideration in the adhesive composition, the above-mentioned components are the only ones deemed essential. However, where a shorter curing time is desired to obtain maximum bonding strength, or a shorter holding time is desired to obtain handling strength, and a somewhat shorter pot life and permissible dwell time is of no consequence, a catalyst may be used to good advantage in the practice of the invention. Furthermore, inclusion of a catalyst in the adhesive composition makes it possible to utilize elevated curing temperatures, without damage to the abrasive material, as such is required with a composition containing a catalyst to be applied only for a very short period of time. Moreover, where long dwell times are involved, heat must be used to tackify the adhesive composition; hence, a catalyst is used in order to shorten the required heating period. There are many catalysts conventionally used to enhance the rate of curing of polyurethane adhesive formulations. However, the catalysts we prefer to use in the practice of our invention are the amine catalysts, e.g., the tertiary amines such as dimethyl cocoamine, tributyl amine, dimethyl benzylamine, and the like. An amine catalyst found particularly suitable is dimethyl cocamine commercially available under the trade designation Armeen DMCD from Armour Industrial Chemical Company. This catalyst, in the practice of our invention, is dissolved in ethyl acetate to which has been added an emulsifier such as Witco's Emulsifier 7786, available from Witco Chemical Company, Inc. A suitable catalyst composition has been found to be:

Catalyst Composition

| Component | Parts by weight |
| --- | --- |
| Ethyl acetate (anhydrous) | 82 |
| Witco's Emulsifier 7786 | 5 |
| Armeen DMCD | 13 |

The adhesive composition is prepared, in the practice of our invention, by mixing together, according to usual mixing techniques, the various components above mentioned. This may be accomplished by adding to the solvent solution of hydroxyl terminated polyurethane a desired amount of suitable tackifying agent. To this solution is then added a suitable amount of the isocyanate component which may, in some instances, depending on the particular isocyanate used also be dissolved in the same or a compatible solvent. Afterwards, the catalyst, in solution, is added in the appropriate amount. However, if desired, the components of the adhesive composition can be added together substantially simultaneously by mixing means well known in the art. The various components used in the adhesive composition may vary in their ratios with respect to one another, depending upon the characteristics desired in the adhesive composition. A longer pot life and permissible dwell time is obtained by using a greater amount of the tackifying agent. As before mentioned such features may be offset somewhat in obtaining a more optimum curing time by inclusion of a catalyst in the adhesive composition. We have found a suitable belt joint results when in such manufacture an adhesive composition is used in which the tackifying agent is from about 1 to about 32 percent; the hydroxyl terminated polyurethane-polyester is from about 75 to about 51 percent; and the isocyanate component is present in sufficient amount to make available free isocyanate groups in an amount from about 0.6 to about 4.0 percent, all of such percentages being by weight based on the total weight of solids in the adhesive composition. The catalyst, when included in the adhesive composition, is present in only very small amounts ranging from about 0.07 to 0.5 percent by weight based on the total weight of adhesive solids.

Subsequent to mixing together the various desired components, the adhesive composition is immediately ready for use. However, quite advantageously we have found, depending upon the particular formulation, it need not be used, provided such is maintained at room temperature, e.g., from about 50° F., for a period of up to about 96 hours. After preparation of the coated abrasive strip material, according to usual techniques for manufacture of an endless belt, the prepared ends thereof are coated with the adhesive composition. The usual procedure involves application of adhesive composition to both end surfaces; however, we have discovered that a satisfactory belt can be formed with the adhesive composition used herein by applying the adhesive composition to only one of the end surfaces. The total amount of adhesive composition, however, is desirably the same as when applied to both of the end surfaces. With application of the adhesive composition to only one surface, we have discovered it to be desirable to utilize a composition having a greater amount of tackifying agent. Apparently, although we do not wish to be limited to this explanation, the tackifying agent not only influences adhesion but also wetting.

After application of the adhesive composition, the wet coated abrasive strip ends must remain unassembled for a short dwell time, e.g., about 5 minutes at room temperature or even less with application of heat. This will permit evaporation of the solvent from the adhesive composition after which curing or cross-linking of the adhesive will be accelerated. Consequently, the longer the dwell time the greater the extent of cure. At longer dwell times no dry tack remains and it becomes necessary, as hereinafter mentioned, to use heat in the bonding operation to obtain a satisfactory belt joint.

Where assembly is conducted shortly after coating, a longer holding time in the press is required to attain sufficient strength to permit handling of the belt. With a longer dwell time prior to assembly, however, a somewhat shorter holding time results in comparable strength for handling. For these reasons, it is highly desirable, in the practice of the invention, that a dwell time of at least about 15 minutes be allowed. Quite advantageously, however, with the use of certain adhesive compositions as disclosed herein it is possible to delay assembly for up to as long as 72 hours. The relief from the requirement of joining the ends relatively shortly after coating permits stockpiling prepared abrasive belt ends so that the high-speed belt presses can be run, if desired, at maximum efficiency.

The adhesive coated abrasive ends, within the permissible dwell time depending on the specific adhesive composition, are assembled together, according to usual techniques, and placed in a conventional press platen to complete manufacture of the endless belt. The pressure used in joining may be varied as desired, e.g., from about 100 to about 10,000 lbs./in.² Such pressure may be applied at either room or elevated temperatures depending, as before-mentioned, on the dwell time involved. In general, the temperature applied and the extent thereof depends somewhat on the length of dwell time of the coated adhesive composition. However, as curing of any specific composition used in the invention is accelerated with application of heat, heat is generally applied during application of pressure to the assembled belt ends. The time and temperature required to effect optimum initial cure whereby to obtain suitable handling strength for any particular adhesive composition will, of course, vary with each particular adhesive composition. Somewhat better joints are, in general, made by using elevated temperatures within the range from about 150° to about 400° F., a preferred temperature being about 240° F., for from about 10 to about 20 seconds. In many instances, although such is not deemed necessary to obtain adequate belt joint strength, a preheating of the assembled belt ends is conducted. This is done by heating only one side of the assembly while such is held under light pressure, e.g., about 100 lbs./in.² A temperature of about 240° F. is applied for about 10 seconds. Such temperature tackifies the adhesive coating and permits safe alignment of the belt ends prior to application of high pressures and curing temperature. In any event, the pressure must be sufficient to produce an adhesion peel strength of at least 13 lbs./inch of width of the joint (the width of the joint being the width of the skived area measured normal to the angle of the joint). Such adhesion peel strength is measured on an Instron Tensile Tester according to ASTM D903-49, except the samples are conditioned for 24-48 hours before testing.

The following examples, which are given for purposes of illustration only and are not intended to be limiting of the inventive concept, will more clearly illustrate the preferred embodiments of the invention.

EXAMPLE 1

An adhesive composition was prepared for use in the manufacture of coated abrasive belts, in accordance with the invention, having the following composition:

| Component | Weight of Solution | Solids | % by wt. solids based on total solids |
|---|---|---|---|
| Bostik 7076 (hydroxyl terminated polyurethane polyester in acetone-toluene solvent) | 40 g. | 8 g. | 60.9 |
| Mondur CB-75 (diisocyanate reaction product in ethyl acetate solvent) | 3.5 g. | 2.6 g. | 19.8 |
| Catalyst composition (dimethyl cocamine) | 0.3 g. | 0.039 g. | 0.3 |
| Paroil 170 HV (chlorinated aliphatic hydrocarbon containing 70% chlorine) | 2.5 g. | 2.5 g. | 19.0 |

To illustrate the influence of adding a tackifying agent to the adhesive composition on pot life thereof, a second adhesive composition was prepared except that the Paroil 170 HV was omitted. The following viscosity data was obtained, according to usual techniques, using a Brookfield LVF-5X Viscometer, No. 2 spindle at 30 r.p.m.

| Time (hr.) | Viscosity, cps. Adhesive composition without tackifying agent | Adhesive composition with tackifying agent |
|---|---|---|
| 0 | 2142 | 2122 |
| 1 | 2247 | 2242 |
| 2 | 2672 | 2452 |
| 3 | 2875 | 2700 |
| 4 | 2850 | 2800 |
| 5 | 3212 | 3022 |
| 6 | 3535 | 3285 |
| 7 | 4137 | 3500 |
| 8 | 5087 | 3700 |

The adhesive composition without tackifying agent (control), after about 8 hours, reaches the state of a rubbery gel thus precluding the satisfactory application thereof as a coating to a substrate. On the other hand, the adhesive composition with tackifying agent, in accordance with our invention, remains spreadable as a coating on a substrate for a much longer period of time.

EXAMPLE 2

A 6-inch wide waterproof cloth-backed coated abrasive strip was prepared for joining and belt formation in the manner well known in the abrasive art. To the ⅜-inch wide skived end surface was applied an adhesive composition according to example 1 by usual techniques. In this instance, both end surfaces to be joined were coated after which they were allowed to stand at room temperature for a period of 180 minutes.

The coated ends were then assembled by overlapping in the usual fashion and the assembly was placed in a press heated to 240° F. The assembly was thus heated for a period of 10 seconds at a pressure of 8,480 lbs./in.²

The belt thus produced was tested in accordance with the previous mentioned ASTM test and the joint therein was found to have an adhesion peel strength value in excess of 13 lbs./inch of joint width.

On subjecting a belt thus manufactured to severe and continuous flexing in the immediate area of the belt joint on a multihead oscillating flex fatigue tester, the belt joint was found to exceed 5,000 flexes before failure occurred. This test is peculiarly directed at producing delamination failure in the adhesive joint. A belt joint which will withstand 2,400 flexes without failing has been considered good in the past.

These tests, it is believed, indicate the excellence of belts manufactured in accordance with our invention. With such performance in the belt joint, belt life is extended accordingly because more prolonged periods of operation are attained without joint failure. Thus more economical use can be made of belts manufactured by our invention in that more of the abrasive surface can be used.

EXAMPLES 3 & 4

In order to determine the effect of extended dwell times on the physical properties of a belt joint, belts were manufactured using the following adhesive compositions:

| Component | Composition* A | B |
|---|---|---|
| Bostik 7076 | 61.2 | 72.0 |
| Mondur CB-75 | 19.4 | 14.4 |
| Dimethyl cocoamine | 0.075 | — |
| Paroil 170 HV | 19.1 | 13.5 |

*percent by weight solids based on total solids.

These adhesive compositions were applied to the prepared ends of a strip of 80X Resinall Metalite nonwaterproof coated abrasive cloth. In the case of adhesive composition A, a dwell time of 24 hours was allowed. A dwell time of 48 hours was allowed with adhesive composition B.

After the designated dwell times, the coated ends were overlapped and the assembly was positioned in a press. The assembly, while held under 100 lbs./in.² pressure was heated by the bottom platen only, such having a temperature of 240° F., for 10 seconds. The assembly was then subjected to a pressure of 8,480 lbs./in.² while being heated by both platens at 240° F. for 10 seconds.

On testing, as before described, each of the belt joints was found to have an adhesion peel strength in excess of 13 lb./inch of joint width and to exceed 5,000 flexes before failure occurred.

EXAMPLE 5

The following adhesive composition was prepared, after which it was coated onto a conventional nonwaterproof coated abrasive strip as mentioned in examples 3 and 4.

| Component | Parts by weight (Solids) |
| --- | --- |
| Bostik 7076 | 72.2 |
| Mondur CB-75 | 21.5 |
| Paroil 170 HV | 6.1 |
| Dimethyl cocoamine Catalyst | 0.46 |

After a dwell time of 45 minutes the adhesive coated ends were assembled in overlapped position and the assembly was placed in a press and held under a pressure of 100 lbs./in.$^2$. The assembly was heated by the bottom platen heated to 240° F. for 10 seconds thereby causing the adhesion to become slightly tacky and permitting safe alignment of the abrasive ends. Afterwards, the assembly was subjected to a pressure of 8,480 lbs./in.$^2$ while being heated (both platens) at 240° F. for 10 seconds.

The belt joint was tested as before except that testing was conducted in 15 minutes after removal from the press. Belts so tested were discovered to have an adhesion peel strength in excess of 13 lbs./inch of joint width and to exceed 5,000 flexes before failure occurred. Thus it is seen that, in accordance with our invention, ultimate strength of the belt joint is obtained in a very short period of time and excessive curing times are not required.

EXAMPLE 6

In this example an aliphatic chlorinated hydrocarbon was employed which contains 41.5 percent chlorine. The adhesive composition had the following composition:

| Component | Parts by weight (Solids) |
| --- | --- |
| Bostik 7076 | 51.2 |
| Mondur CB-75 | 16.55 |
| Dimethyl cocoamine catalyst | 0.25 |
| Unichlor-40 (chlorinated aliphatic hydrocarbon) | 32 |

The above composition was applied to the conventionally prepared ends of a nonwaterproof cloth-backed coated abrasive strip for manufacture of an endless belt. After application, the wet coated ends were allowed to stand at room temperature for a period of 8 hours. The coated ends were then overlapped and pressure was applied similar to that described in example 2. The resultant joint was tested and found to have an adhesion peel strength in excess of 18 lbs./inch of joint width. When this joint was subjected to repetitive flexing, as before mentioned, it withstood 5,000+ flexes before failure occurred.

EXAMPLE 7

An adhesive composition was formulated to contain:

| Component | Parts by weight (Solids) |
| --- | --- |
| Bostik 7076 | 74.55 |
| Mondur CB-75 | 24.16 |
| Tributyl amine | 0.28 |
| Unichlor-50 (chlorinated aliphatic hydrocarbon containing 51% chlorine) | 0.93 |

This adhesive composition was applied to the skived and abraded abrasive strip surfaces similar to that in example 2. After application, the adhesive composition was permitted to dwell for a period of 15 minutes. The coated ends of the abrasive segment were then lapped and pressure was applied in the usual manner described above. This joint, thus formed, when tested, was found to have a peel strength in excess of 14 lbs./inch of joint width. When subjected to the repetitive flexing test, the joint performed well and failed in excess of 5,000 flexings.

EXAMPLE 8

In this example a chlorinated aromatic hydrocarbon was employed as the tackifying agent in the belt joint adhesive composition.

| Component | Parts by weight (Solids) |
| --- | --- |
| Bostik 7076 | 61.0 |
| Mondur CB-75 | 19.7 |
| Dimethyl cocoamine catalyst | 0.3 |
| Aroclor 5460 (chlorinated triphenyl containing 60 % chlorine) | 19.0 |

This adhesive composition was coated on only the abraded end surface of a coated abrasive strip having a paper backing. The other end surface, which was skived, was not coated. The wet coated end surface was allowed to remain exposed 1 hour at room temperature before joining. The joint assembly was placed in a press heated to 150° F. for a period of 15 seconds at a pressure of 8,480 lbs./in.$^2$. The resultant joint on testing was found to have an adhesion peel strength in excess of the ply strength of the paper backing. When this joint area was subjected to repetitive flexings as described in the preceding examples it withstood 4,120 flexes before failure occurred.

EXAMPLE 9

An adhesive composition was formulated to contain:

| Component | Parts by weight (Solids) |
| --- | --- |
| Bostik 7076 | 68.47 |
| Mondur MR (polyphenyl polymethylene polyisocyanate) | 9.65 |
| Dimethyl cocoamine catalyst | 0.33 |
| Aroclor 1268 (chlorinated biphenyl containing 68% chlorine) | 21.55 |

The above composition was coated on the skived and abraded end surfaces of a nonwaterproof abrasive strip for manufacture of an endless belt. The wet coated surfaces were allowed to stand for 3 hours at room temperature before joining. The coated ends were then overlapped and pressed for 20 seconds at 240° F. at a pressure of 8,480 lbs./in.$^2$. Adhesion peel strength was determined to be in excess of 15 lbs./inch of joint width. The belt joint withstood repetitive flexings in excess of 5,000 before failure occurred.

EXAMPLE 10

An adhesive composition was formulated to contain still another type of chlorinated aromatic hydrocarbon tackifying agent:

| Component | Parts by weight (Solids) |
| --- | --- |
| Bostik 7076 | 53 |
| Mondur CB-75 | 30.40 |
| Dimethyl cocoamine catalyst | 0.28 |
| Aroclor 1254 (chlorinated biphenyl containing 54% chlorine) | 16.32 |

This adhesive formulation was coated on a backing similar to that described in example 9. The wet coated end surfaces were allowed to stand for a period of 2 hours at room temperature before joining. The pressing time, temperature and pressure was similar to that described in example 9. The joint formed was found to have an adhesion peel strength in excess of 13 lbs./inch width. The joint area was found satisfactory in a multiple flex test giving a value of 4,800 cycles.

EXAMPLE 11

An adhesive composition was prepared having the following composition:

| Component | % By weight solids |
| --- | --- |
| Bostik 7076 | 67.3 |
| Mondur CB-75 | 22.0 |
| Piccolastic E-75 | 10.5 |
| Dimethyl cocoamine | 0.25 |

The adhesive composition was applied to the prepared ends of a strip of nonwaterproof abrasive cloth as mentioned in example 3. After a dwell time of 48 hours, the adhesive coated ends were assembled in overlapped position as indicated in the drawing and the assembly was placed in a press as before mentioned. The assembly was held under 100 lbs./in.$^2$ pressure for 10 seconds while the lower pressure bar or platen was at 240° F. Subsequently the assembly was subjected to 8,480 lbs./in.$^2$ pressure by heated platens at 240° F. for 10 seconds.

On testing as before described, belts so manufactured were discovered to have an adhesion peel strength in excess of 13 lbs./inch of joint width and to exceed 2,600 flexes before failure occurred.

As many different embodiments of our invention will occur to those skilled in the art, it is to be understood that the specific embodiments of the invention as presented herein are intended by way of illustration only and not limiting on the invention but that the limitations thereon are to be determined only from the appended claims.

What we claim is:

1. Coated abrasive material in which at least two free ends are overlapped and the opposing surfaces are adhesively joined together to form a joint, said adhesive composition consisting essentially of the cured reaction product of a hydroxyl terminated polyurethane-polyester having a hydroxyl number no greater than about 15 and a compound having available free isocyanate groups, and a tackifying agent compatible with said reaction product and present in the adhesive composition in sufficient amount to slow down the curing of the adhesive composition thereby providing an adhesive composition in the uncured state of relatively prolonged shelf life or pot life and extended dwell time, said tackifying agent being selected from the group consisting of alkylated polystyrene resins, chlorinated aromatic hydrocarbons, and chlorinated aliphatic hydrocarbons, the joint so formed providing excellent resistance to forces tending to delaminate one joined surface from the other.

2. Coated abrasive material according to claim 1 wherein said joint has an adhesion peel strength exceeding 13 lbs./inch of width.

3. Coated abrasive material according to claim 1 wherein said tackifying agent in the adhesive composition is a chlorinated hydrocarbon having a minimum of 40 percent combined chlorine.

4. Coated abrasive material in accordance with claim 3 in which, based upon the weight of total solids in the adhesive composition, the tackifying agent is from about 1 to about 32 percent, the hydroxyl terminated polyurethane-polyester is from about 75 to about 51 percent, and the isocyanate component is present in sufficient amount to make available free isocyanate group in an amount from about 0.6 to about 4 percent.

5. Coated abrasive material according to claim 4 including in said adhesive composition a catalyst suitable for catalyzing the reaction between the free isocyanate groups and the hydroxyl groups thus providing for more rapid cure of the adhesive composition, said catalyst being present in an amount from about 0.07 to about 0.5 percent.

* * * * *